United States Patent
Lee et al.

(10) Patent No.: US 7,086,631 B2
(45) Date of Patent: Aug. 8, 2006

(54) QUICK-RELEASE TELESCOPING TRIPOD

(75) Inventors: Wade Lee, Danville, CA (US); You De Zhong, Ninghai (CN)

(73) Assignee: EML Technologies LLC, Danville, CA (US)

( * ) Notice: Subject to any disclaimer, the term of this patent is extended or adjusted under 35 U.S.C. 154(b) by 0 days.

(21) Appl. No.: 10/792,641

(22) Filed: Mar. 3, 2004

(65) Prior Publication Data

US 2005/0194503 A1 Sep. 8, 2005

(51) Int. Cl.
*F16M 11/00* (2006.01)

(52) U.S. Cl. .................. 248/161; 248/407; 248/410; 248/408; 248/188.5

(58) Field of Classification Search ............... 248/168, 248/169, 177.1, 163.1, 435, 434, 410, 411, 248/412, 414
See application file for complete search history.

(56) References Cited

U.S. PATENT DOCUMENTS

| | | | |
|---|---|---|---|
| 538,500 A | 4/1895 | Bulkley | |
| 1,490,650 A | 4/1924 | Wagner | |
| 1,863,442 A | 6/1932 | Goodman | |
| 2,473,947 A | 6/1949 | Hamstrom | |
| 2,907,598 A | 10/1959 | Hart | |
| 3,930,645 A | 1/1976 | Anderson | |
| 4,029,279 A * | 6/1977 | Nakatani | 248/188.5 |
| 4,289,244 A * | 9/1981 | Frankhouser et al. | 211/117 |
| 4,733,844 A | 3/1988 | Molloy | |
| 4,926,722 A | 5/1990 | Sorensen | |
| 4,932,622 A | 6/1990 | Hayakawa | 248/188.5 |
| 6,044,934 A * | 4/2000 | Nemeth | 188/67 |
| 6,338,475 B1 | 1/2002 | Ping | |
| 6,386,530 B1 | 5/2002 | Marks | |
| 6,409,412 B1 * | 6/2002 | Huang | 403/109.3 |
| 6,578,837 B1 | 6/2003 | Blank et al. | |
| 6,648,315 B1 | 11/2003 | Lee | |
| 6,663,060 B1 * | 12/2003 | Gifford, Sr. | 248/161 |
| 6,834,840 B1 * | 12/2004 | Smith et al. | 248/410 |

* cited by examiner

*Primary Examiner*—Kimberly Wood
*Assistant Examiner*—Steven Marsh
(74) *Attorney, Agent, or Firm*—Elliot B. Aronson

(57) ABSTRACT

A telescoping stand with a quick-release locking mechanism for binding and releasing a telescoping section including an inner extension member that telescopes into and out of an outer receiving member. The locking mechanism includes a pair of opposed actuator members, each with a hole through it and disposed so that the inner extension member of a telescoping pair passes through the holes. When the actuator members are generally perpendicular to the extension member, the extension member slides freely through the holes. In the normal configuration the actuator members are biased so that each is canted with respect to the extension member and so that the two actuator members are canted in opposed directions. In this configuration the actuator members provide a double binding frictional engagement with the extension member to hold it in fixed relation with respect to its associated receiving member. The actuator members are provided with tab ends that a user may squeeze together to move the actuator members toward their generally perpendicular orientation and thereby release the frictional engagement with the extension member.

3 Claims, 2 Drawing Sheets

QUICK-RELEASE TELESCOPING TRIPOD

BACKGROUND OF THE INVENTION

The present invention relates to portable telescoping tripods or similar support stands such as may be used for supporting worklights or the like.

Portable worklights are found in a variety of settings such as construction sites, industrial plants, automotive and auto body repair shops, artist and photographic studios, and around the home for do-it-yourself projects. These lights are often used with a separate upright stand such as a telescoping tripod for adjusting the height off the ground or work surface. In keeping with common usage, such telescoping support structures may generally be referred to herein a; "tripods" and no limitation specifically to a three-legged structure is intended. In the conventional tripod a telescoping section is held in place by a surrounding threaded grip mechanism that is tightened down onto the extendable piece by turning the grip handle about its central axis.

SUMMARY OF THE INVENTION

The present invention provides a telescoping support structure with a quick-release mechanism that may be readily actuated for quickly raising and lowering the telescoping sections with much less effort than generally required by the conventional release mechanism. The present quick-release mechanism provides an extremely secure grip for preventing the sections from slipping once adjusted to the desired height, yet may be released especially quickly and easily with a minimum of effort.

Unlike the conventional mechanism, the present mechanism requires no twisting or unscrewing to loosen the mechanism and is not subject to overtightening as is the conventional twist mechanism.

Briefly, a quick-release locking mechanism according to the invention is used with a conventional telescoping stand in which a telescoping section includes an outer receiving member and an inner extension member that can telescope in and out of the receiving member. The locking mechanism includes a pair of opposed actuator members, each with a hole through it and disposed so that the inner extension member of a telescoping pair passes through the holes. When the actuator members are generally perpendicular to the extension member, the extension member slides freely through the holes. In the normal configuration the actuator members are biased so that each is canted with respect to the extension member and so that the two actuator members are canted in opposed directions. In this configuration the actuator members provide a double binding frictional engagement with the extension member to hold it in fixed relation with respect to its associated receiving member. The actuator members are provided with tab ends that a user may squeeze together to move the actuator members toward their generally perpendicular orientation and thereby release the frictional engagement with the extension member. The actuator members are contained in a housing affixed to the receiving member and defining a window through which the tab ends of the actuator members extend for engagement by a user. In one aspect of the invention the housing includes a pair of interior cavities with recessed regions receiving and retaining the pivot portion of the respective actuator members. In another aspect of the invention the housing includes a portion disposed between the tab ends of the actuator members and formed with a spring-retaining hole for retaining a spring for biasing the actuator members apart.

Other aspects, advantages, and novel features of the invention are described below or will be readily apparent to those skilled in the art from the following specifications and drawings of illustrative embodiments.

DETAILED DESCRIPTION OF ILLUSTRATIVE EMBODIMENTS

Figure 1:
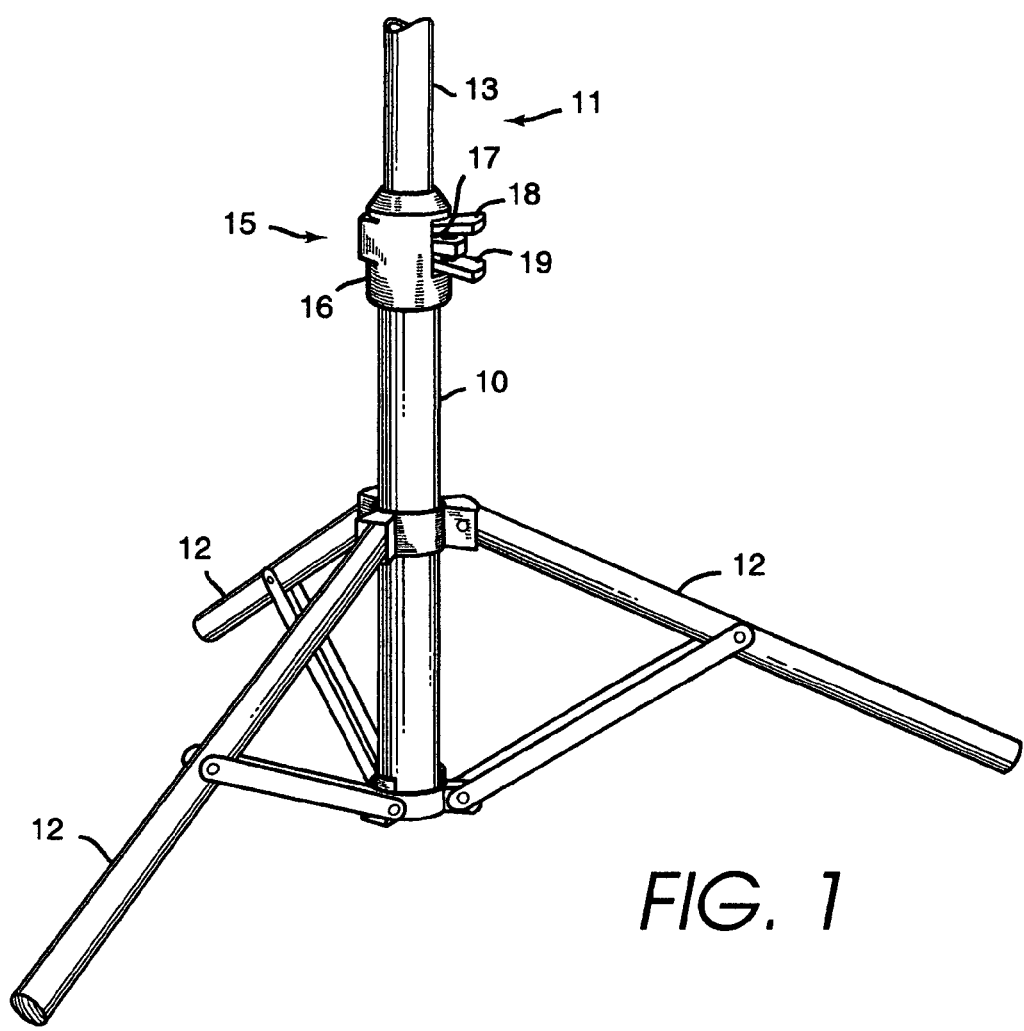
FIG. 1 is an overall perspective view of a tripod with a quick-release mechanism according to the invention.

FIG. 1 shows an extendable tripod support stand including a base section 10, a first extendable section indicated generally at reference numeral 11, and a plurality of deployable tripod legs 12 for supporting the stand on the ground or other work surface. The extendable section 11 comprises a tubular extension member 13 in telescoping relation with a tubular receiving member provided here by tubular base member 10. A quick-release locking mechanism 15 according to the invention is interposed between extension member 13 and receiving member 10 and holds the extension member securely in its extended position, yet can be quickly and easily released to permit the extension member to be retracted into the receiving member 10.

The arrangement of tripod legs and the manner by which they are deployed are entirely conventional and do not form a part of the invention. Moreover, the number of legs plays no role in the invention, a three-legged tripod being shown here only for purposes of illustration. Also for purposes of illustration, the tubular members 10 and 13 are shown as cylindrical although no limitation to cylindrical sections is intended, and tubular members of other cross-sectional shapes, such as square, rectangular, trianguloid, or even shapes with curving sides or rounded corners may be used. A single extendable section 11 is shown here for illustration, although further telescoping tubular members can also be used.

As seen in FIG. 1 locking mechanism 15 includes a housing 16, which is secured to the receiving base member 10. Extension member 13 slides through the housing as it telescopes into and out of receiving base member 10. The housing is provided with a window 17, out of which extend a pair of projecting tabs 18 and 19 to be grasped by a user for actuating the release mechanism to re-position extension member 13. In the normal configuration locking mechanism 15 grips extension member 13 and holds it firmly in place. To release the mechanism for collapsing the telescoping sections or for adjusting the height of the extension member, it is only necessary for the user to squeeze the two tabs 18 and 19 together and then slide the upper extension member to the desired height. This provides a marked improvement over the prior art with respect to such factors as ease of use, the swiftness with which the mechanism can be released (almost instantaneously), and even reliability of operation. In the past the user has typically had to firmly grasp and twist a locking member, which could prove difficult if the locking member had been overtightened and sometimes even required two hands to achieve.

Figure 2:
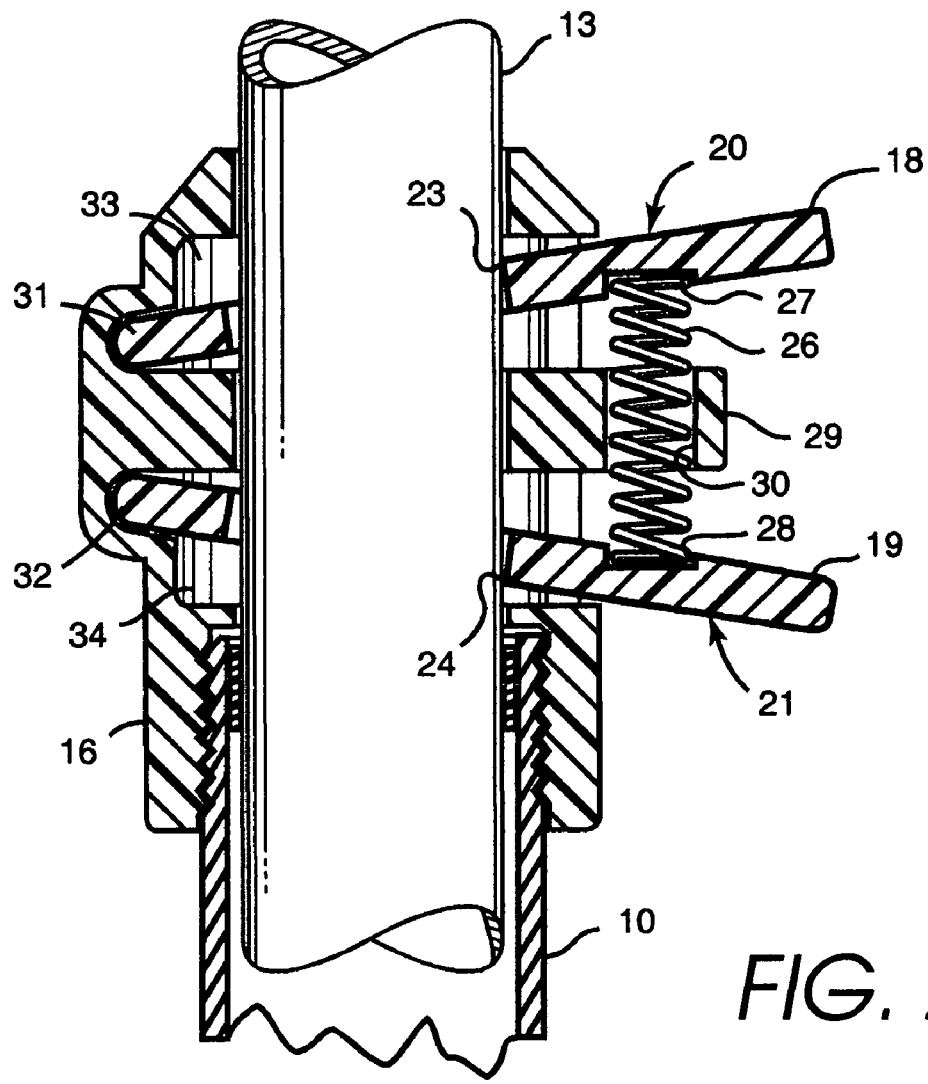
FIG. 2 is a cross-sectional view of an embodiment of quick-release mechanism according to the invention.
Figure 3:
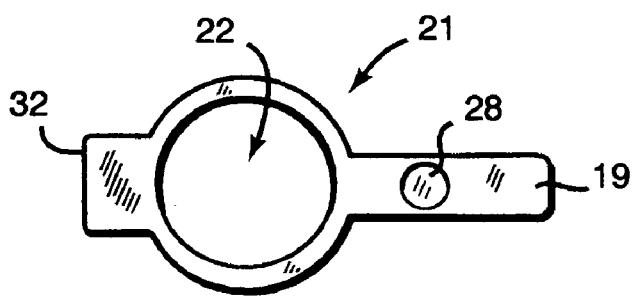
FIG. 3 is a plan view of an embodiment of an actuator member forming a part of the quick-release mechanism of FIG. 2.

Turning now to FIGS. 2 and 3, the locking mechanism 15 includes a pair of actuator members 20 and 21. Each actuator member is formed with a hole 22 through it for receiving extension member 13 and has a linearly projecting portion providing the projecting tab 18 or 19. The tabs 18 and 19 are formed to project outside of the housing and to be engaged by a user. The hole is formed and dimensioned to have sufficient clearance that extension member 13 can freely slide through it when the actuator member is oriented generally perpendicular to the extension member. When the actuator member is tipped or canted with respect to the extension member, however, the edge of the hole comes into binding frictional engagement with the extension member.

As seen in FIG. 2, the two actuator members are biased into opposed canted orientation with respect to extension member 13. That is to say, actuator member 20 is biased upward so that it contacts extension member 13 at the upper edge 23 of its hole while actuator member 21 is biased downward so that it contacts extension member 13 at the lower edge 24 of its hole. In the embodiment of FIG. 2 the biasing is provided by compression spring 26. The tabs 18, 19 include recessed areas 27, 28 for receiving an end of spring 26. Housing 16 is formed with a midsection 29 that includes a spring-retaining bore 30 disposed between the tabs 18 and 19 for receiving and retaining compression spring 26. In their opposed canted orientation the actuator members provide a double binding action al the edges 23 and 24 holding extension member 13 in position. As the actuator members are moved so that each approaches the generally perpendicular orientation, the binding engagement is released and extension member 13 is free to slide through the actuator members.

In general, the actuator members are structured and arranged such that squeezing the tabs 18 and 19 together will have the effect of urging the actuator members toward their generally perpendicular orientation. In the embodiment of FIG. 2 this is achieved by providing the actuator members 20, 21 with pivot arms 31, 32 extending away from the hole on the opposite side of the hole from the projecting tabs 18, 19. The housing is formed interiorly to capture the pivot arms at their ends so that the actuator members are restrained to pivot up and down about the pivot arm ends. In this way, the actuator members may be easily moved between the doubly binding, opposed canted orientation and the freely sliding, generally perpendicular orientation merely by squeezing the tabs toward one another. In FIG. 2 the interior of the housing is formed with separate upper and lower cavities 33 and 34 for the two actuator members. This arrangement provides a natural stop for the actuator movement so that the actuator members cannot be urged beyond their generally perpendicular orientation to become canted in the reverse direction. The separate cavities also provide a natural spacing to provide room for the compression spring in its fully compressed configuration between the two actuator members.

For the actuator members in their opposed canted orientation to hold the extension member in a desired fixed position with respect to the receiving member, it is of course necessary that the actuator members themselves be secured to the receiving member. In the illustrated embodiment the actuator members are secured to the receiving member entirely by virtue of being retained within the housing, which is in turn fixed to receiving member 10. In FIG. 2 the housing is threaded onto the lower receiving member 10, but the particular manner in which the housing is secured to the receiving member is not important to the operation of the invention and any convenient manner of securement may also be used.

The embodiment of quick-release locking mechanism illustrated herein includes a housing. A housing is desirable to protect the mechanism against possible damage or accumulation of dust, dirt or grime at the worksite. A housing can also be styled to have a decorative outward appearance and to enhance the overall decorative lines of the support stand. And as mentioned, the housing in the illustrated embodiment serves to secure the actuator members to the receiving member. Yet further, other forms of springs or resilient members may be used to bias the actuator members instead of the compression spring illustrated here, and the actuator members themselves may even have a natural resiliency contributing to or providing the necessary biasing.

Thus, it is not intended to limit the invention only to the embodiments explicitly illustrated or described herein, which are offered here only to illustrate and give examples of various embodiments and aspects of the invention. Given the benefit of the teachings contained herein, those skilled in the art may be able to devise various modifications and alternate constructions that differ from the examples disclosed herein, but nevertheless enjoy the benefits of the invention and fall within the scope of the invention, which is to be defined by the following claims.

What is claimed is:

1. In a vertically extendable support stand having one or more extendable sections comprising a tubular extension member in telescoping relation with a tubular receiving member, and further including a releasable locking mechanism between the extension and receiving members, the locking mechanism comprising a pair of opposed actuator members, each actuator member having a hole through it and a projecting tab formed for engagement by a user, the actuator members being disposed so that the extension member passes through the actuator holes and so that the actuator members generally pivot about an end opposite said tabs, wherein the actuator holes are formed and dimensioned so that the extension member slides freely through the actuator holes when the actuator members are in generally perpendicular orientation with respect to the extension member and so that the actuator members frictionally engage the extension member at the actuator holes when the actuator members are in opposed canted orientation with respect to the extension member, the improvement characterized in that:

said releasable locking mechanism includes compression spring disposed outside of said receiving member for urging said actuator members into said opposed canted orientation, said compression spring engaging said actuator members generally at said projecting tabs to normally urge said projecting tabs apart from one another; and said releasable locking mechanism further comprises a housing affixed to said receiving member and having a central bore receiving said extension member, said housing defining a window through which said projecting tabs extend for user engagement;

wherein said housing further comprises a portion formed with a spring-retaining hole therethrough, said portion being disposed between said projecting tabs; and said compression spring extends through said spring-retaining hole between said projecting tabs.

2. In a vertically extendable support stand having one or more extendable sections comprising a tubular extension member in telescoping relation with a tubular receiving member, and further including a releasable locking mechanism between the extension and receiving members, the locking mechanism comprising a pair of opposed actuator members, each actuator member having a hole through it and a projection tab formed for engagement by a user, the actuator members being disposed so that the extension member passes through the actuator holes and so that the actuator members generally pivot about an end opposite said tabs, wherein the actuator holes are formed and dimensioned so that the extension member slides freely through the actuator holes when the actuator members are in generally perpendicular orientation with respect to the extension member and so that the actuator members frictionally engage the extension member at the actuator holes when the actuator members are in opposed canted orientation with respect to the extension member, the improvement characterized in that:

said releasable locking mechanism includes biasing means disposed outside of said receiving member for urging said actuator members into said opposed canted orientation, said biasing means engaging said actuator members generally at said projecting tabs to normally urge said projecting tabs apart from one another, and said releasable locking mechanism further comprises a housing affixed to said receiving member and having a central bore receiving said extension member, said housing defining a window through which said projecting tabs extend for user engagement;

wherein said housing is formed in its interior with an upper cavity for receiving a first of said actuator members and a lower cavity for receiving the other of said actuator members, said upper and lower cavities each being formed with a recessed region to receive and retain the pivot portion of the respective actuator member, whereby said housing holds said actuator pivot portions in pivoting disposition.

3. The apparatus of claim 2 wherein said biasing means comprises a compression spring, and wherein said housing further comprises a portion formed with a spring-retaining hole therethrough, said portion being disposed between said projecting tabs; and said compression spring extends through said spring-retaining hole between said projecting tabs.

* * * * *